United States Patent
Shah et al.

(10) Patent No.: US 12,055,771 B2
(45) Date of Patent: Aug. 6, 2024

(54) OPTICAL BLOCK WITH TEXTURED SURFACE

(71) Applicant: Samtec, Inc., New Albany, IN (US)

(72) Inventors: Jignesh H. Shah, Sunnyvale, CA (US); William J. Kozlovsky, Sunnyvale, CA (US); David A. Langsam, Sunnyvale, CA (US); Raymond J. Lee, Fremont, CA (US); R. Brad Bettman, Mountain View, CA (US); Eric Jean Zbinden, Sunnyvale, CA (US)

(73) Assignee: SAMTEC, INC., Albany, IN (US)

( * ) Notice: Subject to any disclaimer, the term of this patent is extended or adjusted under 35 U.S.C. 154(b) by 0 days.

(21) Appl. No.: 18/122,166

(22) Filed: Mar. 16, 2023

(65) Prior Publication Data
US 2023/0221504 A1    Jul. 13, 2023

Related U.S. Application Data

(63) Continuation of application No. 17/104,319, filed on Nov. 25, 2020, now Pat. No. 11,693,194, which is a continuation of application No. 15/078,162, filed on Mar. 23, 2016, now Pat. No. 10,884,198.

(60) Provisional application No. 62/137,364, filed on Mar. 24, 2015.

(51) Int. Cl.
G02B 6/42    (2006.01)

(52) U.S. Cl.
CPC ......... *G02B 6/4206* (2013.01); *G02B 6/4214* (2013.01); *G02B 6/4246* (2013.01); *G02B 6/4257* (2013.01)

(58) Field of Classification Search
CPC ................... G02B 6/42; G02B 6/00
USPC .......................................... 385/18
See application file for complete search history.

(56) References Cited

U.S. PATENT DOCUMENTS

| | | | | |
|---|---|---|---|---|
| 4,692,003 A | * | 9/1987 | Adachi | A61B 3/107 351/212 |
| 4,733,065 A | * | 3/1988 | Hoshi | G11B 11/10541 369/112.13 |
| 4,733,067 A | * | 3/1988 | Oinoue | G11B 7/0909 |
| 4,736,100 A | * | 4/1988 | Vastagh | G02B 6/4246 356/73.1 |
| 4,737,896 A | * | 4/1988 | Mochizuki | G02B 6/0068 362/335 |
| 5,101,389 A | * | 3/1992 | Ohuchida | G11B 7/1362 |
| 5,155,372 A | * | 10/1992 | Bowen | G01N 21/95623 250/237 R |
| 5,175,780 A | * | 12/1992 | Sano | G02B 6/3514 385/47 |

(Continued)

OTHER PUBLICATIONS

Shah et al., "Optical Block With Textured Surface", U.S. Appl. No. 17/104,319, filed Nov. 25, 2020.

(Continued)

*Primary Examiner* — Kaveh C Kianni
(74) *Attorney, Agent, or Firm* — Keating & Bennett, LLP

(57) ABSTRACT

An optical block includes a first surface that receives light entering the optical block, a second surface through which the light exits the optical block, and a reflector that reflects light from the first surface towards the second surface. The reflector includes a textured surface that scatters or absorbs some of the light received from the first surface to attenuate the light exiting the optical block through the second surface.

7 Claims, 4 Drawing Sheets

(56) References Cited

U.S. PATENT DOCUMENTS

| | | | | |
|---|---|---|---|---|
| 5,539,577 A * | 7/1996 | Si | G02B 6/2937 | 385/47 |
| 5,541,057 A * | 7/1996 | Bogart | G01N 33/552 | 436/805 |
| 5,550,063 A * | 8/1996 | Bogart | G01N 33/54373 | 436/805 |
| 5,552,272 A * | 9/1996 | Bogart | G01N 33/582 | 436/805 |
| 5,665,982 A * | 9/1997 | Torikai | H01S 5/023 | 257/82 |
| 5,727,111 A * | 3/1998 | Kume | G11B 7/1362 | 385/94 |
| 5,838,504 A * | 11/1998 | Ichikawa | G03B 13/06 | 359/834 |
| 5,877,858 A * | 3/1999 | Kerstens | G11B 5/84 | 356/600 |
| 5,900,935 A * | 5/1999 | Klein | G01H 9/00 | 73/656 |
| 6,396,069 B1 * | 5/2002 | MacPherson | G01B 9/02007 | 250/559.22 |
| 6,542,671 B1 * | 4/2003 | Ma | G02B 6/12002 | 385/47 |
| 6,834,069 B1 * | 12/2004 | Bergmann | G02B 5/1814 | 372/57 |
| 7,083,610 B1 * | 8/2006 | Murray | A61B 18/18 | 607/91 |
| 7,852,474 B2 * | 12/2010 | Dobschal | G01J 3/02 | 356/328 |
| 8,457,457 B2 * | 6/2013 | Morioka | G02B 6/4206 | 385/47 |
| 9,151,916 B2 * | 10/2015 | Pommer | G02B 6/4201 | |
| 9,325,445 B2 * | 4/2016 | Khor | G02B 6/29365 | |
| 9,470,857 B2 * | 10/2016 | Shah | G02B 6/4246 | |
| 9,784,670 B1 * | 10/2017 | Mohan | G02B 5/1814 | |
| 10,345,542 B2 * | 7/2019 | Rockman | G02B 6/4246 | |
| 2002/0114362 A1 * | 8/2002 | Vogler | H01S 3/08009 | 372/32 |
| 2002/0196821 A1 * | 12/2002 | Jang | H01S 5/026 | 372/50.1 |
| 2003/0026582 A1 * | 2/2003 | In' T Hout | G02B 6/358 | 385/140 |
| 2003/0043321 A1 * | 3/2003 | Chien | G02F 1/133553 | 349/113 |
| 2003/0094433 A1 * | 5/2003 | Ouellet | G02B 5/0891 | 216/24 |
| 2003/0210222 A1 * | 11/2003 | Ogiwara | G02B 6/0061 | 345/103 |
| 2003/0223726 A1 * | 12/2003 | Neukermans | G02B 6/359 | 385/140 |
| 2004/0012771 A1 * | 1/2004 | Ehbets | G01P 3/68 | 356/4.01 |
| 2004/0264881 A1 * | 12/2004 | Posamentier | G02B 6/4214 | 385/88 |
| 2005/0024614 A1 * | 2/2005 | Bakker | G21K 1/06 | 355/71 |
| 2005/0147353 A1 * | 7/2005 | Vancoill | G02B 6/4204 | 385/47 |
| 2005/0237602 A1 * | 10/2005 | Yanagisawa | H01S 3/30 | 359/340 |
| 2005/0281053 A1 * | 12/2005 | Marra | G02B 6/0031 | 362/617 |
| 2006/0013553 A1 * | 1/2006 | Imai | G02B 6/352 | 385/140 |
| 2006/0068512 A1 * | 3/2006 | Ohshima | G01N 21/9505 | 438/14 |
| 2006/0110123 A1 * | 5/2006 | Duine | G02B 6/0036 | 385/146 |
| 2007/0183716 A1 * | 8/2007 | Suzuki | G02B 6/4286 | 385/33 |
| 2008/0002753 A1 * | 1/2008 | Timans | G01K 15/00 | 374/2 |
| 2008/0049798 A1 * | 2/2008 | Satou | H01S 5/0687 | 372/32 |
| 2008/0123106 A1 * | 5/2008 | Zeng | A61B 5/0066 | 356/600 |
| 2008/0165539 A1 * | 7/2008 | Hsu | H01L 33/60 | 257/E33.059 |
| 2008/0177169 A1 * | 7/2008 | Chapman | G02B 5/0284 | 600/407 |
| 2008/0304004 A1 * | 12/2008 | Amako | G02B 5/3058 | 349/201 |
| 2009/0251741 A1 * | 10/2009 | Sheng | H04N 1/02815 | 358/475 |
| 2009/0261240 A1 * | 10/2009 | Watanabe | G01B 9/02004 | 250/252.1 |
| 2010/0265974 A1 * | 10/2010 | Wang | H01S 5/4025 | 372/38.01 |
| 2010/0271443 A1 * | 10/2010 | Nelson | B41J 2/17513 | 347/86 |
| 2010/0295063 A1 * | 11/2010 | Morioka | H01L 27/14625 | 359/619 |
| 2011/0057204 A1 * | 3/2011 | Morioka | G02B 6/4214 | 257/E33.077 |
| 2011/0075965 A1 * | 3/2011 | DeMeritt | G02B 6/4214 | 428/164 |
| 2011/0080642 A1 * | 4/2011 | Watanabe | G02B 5/1895 | 359/566 |
| 2011/0122737 A1 * | 5/2011 | Shimazawa | G11B 5/314 | 360/59 |
| 2011/0141048 A1 * | 6/2011 | Brosnan | G06F 3/042 | 345/173 |
| 2012/0133928 A1 * | 5/2012 | Urano | G01N 21/9501 | 356/237.2 |
| 2012/0155803 A1 * | 6/2012 | Benjamin | G02B 6/32 | 385/33 |
| 2012/0163754 A1 * | 6/2012 | Benjamin | G02B 6/32 | 385/33 |
| 2012/0235036 A1 * | 9/2012 | Hatakeyama | H01J 37/20 | 250/310 |
| 2013/0114078 A1 * | 5/2013 | Honda | G01N 21/8806 | 356/237.1 |
| 2013/0155723 A1 * | 6/2013 | Coleman | G02B 6/0036 | 362/621 |
| 2013/0209745 A1 * | 8/2013 | Legoux | C23C 4/02 | 428/161 |
| 2014/0092377 A1 * | 4/2014 | Liu | G01N 21/23 | 356/51 |
| 2014/0299752 A1 * | 10/2014 | Huang | G01J 1/0425 | 362/327 |
| 2014/0365158 A1 * | 12/2014 | Dubois | G01B 17/06 | 702/104 |
| 2016/0178516 A1 * | 6/2016 | Abdulhalim | G01N 29/022 | 977/954 |
| 2016/0341903 A1 * | 11/2016 | Tang | G02B 6/4206 | |
| 2017/0199342 A1 * | 7/2017 | Huang | G02B 6/4214 | |
| 2017/0371111 A1 * | 12/2017 | Morioka | G02B 6/4286 | |
| 2019/0094475 A1 * | 3/2019 | Morioka | G02B 6/4246 | |
| 2020/0409000 A1 * | 12/2020 | Kon | G02B 6/4286 | |

OTHER PUBLICATIONS

Girlando et al., "Controlled Attenuation of a Reflection From a Coated Surface", U.S. Appl. No. 18/283,555, filed Sep. 22, 2023.

* cited by examiner

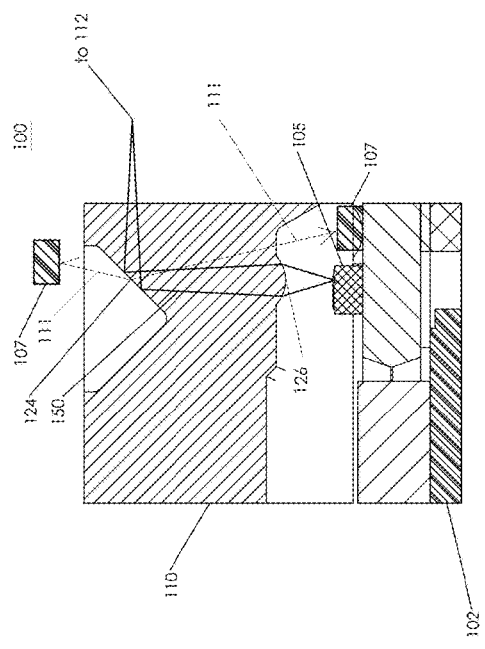
FIG. 3
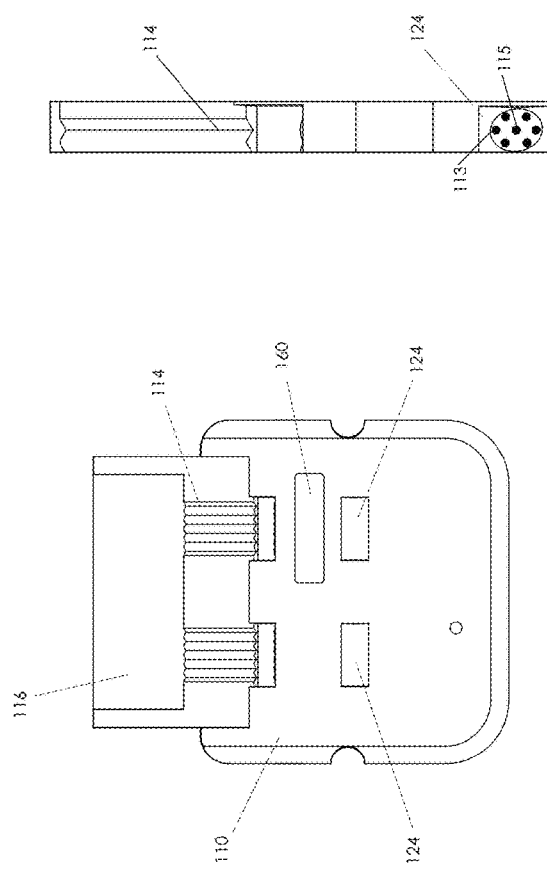
FIG. 4
FIG. 5

OPTICAL BLOCK WITH TEXTURED SURFACE

BACKGROUND OF THE INVENTION

1. Field of the Invention

The present invention relates to optical blocks. More specifically, the present invention relates to an optical block with a modified surface.

2. Description of the Related Art

Good modulation characteristics of high-transfer-rate data include having high and uniform contrast between the "on" (digital 1) and "off" (digital 0) states. To achieve good modulation characteristics, it is often necessary to operate a laser in an optical system that generates the high-transfer-rate data at a current well above the laser threshold current, which can generate an excessively large amount of light transmitted through an optical fiber. High optical power levels in an optical fiber can cause detector saturation in a receiver and/or induce signal distortion through optical nonlinearities. Thus, it is desirable to attenuate the amount of light before it enters the optical fiber.

To attenuate the light before entering into an optical fiber, it is known to use an optical attenuator in the optical path of the light. If the optical path includes an optical block, then it is known to use an optical block made from different materials with different attenuation characteristics, e.g., 1 dB, 2 dB, etc. It is also known to use an in-line optical attenuator. For example, a thin-film on a glass substrate or a bulk absorptive attenuator can be used in the optical path. It is also known to defocus the light before it enters the optical fiber. These techniques have the disadvantage that all channels must have the same attenuation and cannot adapt to part-to-part variations. In addition, for bidirectional transceivers that include both transmit and receive channels in the same optical block, it can sometimes be difficult with these techniques to only attenuate the transmitter channels, which is desired so as to not reduce the sensitivity of the receiver channels.

Adding an attenuator increases the part count and adds cost and complexity. Multi-channel devices can require multiple attenuation blocks with different attenuation levels. Defocusing the light to decrease the coupling into an optical fiber can result in the excitation of undesirable cladding modes. Defocusing the light can increase the mechanical adjustment range required to achieve the desired degree of attenuation. If the optical fibers are arranged in an optical fiber ribbon, then the attenuation of each optical fiber cannot be individually adjusted because all the optical fibers are mechanically linked. Thus, there is a need for a method and apparatus that can reduce the transmitted light to an appropriate level without adding additional components or mechanical complexity and that can attenuate the transmitted light on a channel-by-channel basis.

SUMMARY OF THE INVENTION

To overcome the problems described above, preferred embodiments of the present invention provide an optical block that provides attenuation in an optical path, transmitter power monitoring, and variation in the attenuation between channels.

An optical block according to a preferred embodiment of the present allows for the attenuation to be actively performed, while monitoring optical power transmitted through an output optical fiber. A fraction of the transmitter power that is not coupled into the output optical fiber can be coupled into a photodetector, which can be used for transmitter power monitoring. Transmitter power monitoring is useful in determining the operational status of the transmitter over its lifetime. The attenuation can be customized for each channel in a multi-channel device.

According to a preferred embodiment of the present invention, an optical block includes a first surface that receives light entering the optical block, a second surface through which the light exits the optical block, and a reflector that reflects light from the first surface towards the second surface. The reflector includes a textured surface that scatters or absorbs some of the light received from the first surface to attenuate the light exiting the optical block through the second surface.

The textured surface preferably includes at least one of dimples, dots, and scratches. The dots are preferably made of material with an index of refraction that matches or substantially matches an index of refraction of the optical block.

The optical block is preferably a molded optical block. Preferably, the textured surface includes defects formed by a molding process or a surface modification process.

According to a preferred embodiment of the present invention, an optical engine includes a substrate, a laser mounted to the substrate, an optical block according to one of the various preferred embodiments of the present invention, and an optical fiber that receives light from the second surface of the optical block. The light received by the first surface of the optical block is generated by the laser.

The optical engine further preferably includes a photodetector that detects light scattered by the textured surface. The optical engine preferably includes multiple channels. Preferably, at least two optical channels have different attenuation levels, or the textured surface scatters the same amount of light for each channel of the multiple channels.

According to a preferred embodiment of the present invention, a method of attenuating light in an optical engine includes providing an optical engine with a substrate; a laser mounted to the substrate; an optical block including a first surface that receives light entering the optical block from the laser, a second surface through which the light exits the optical block, and a reflector that reflects light from the first surface towards the second surface; and an optical fiber that receives light from the second surface of the optical block; determining a current provided to the laser, measuring optical power in the optical fiber, and texturing a surface of the reflector until the optical power measured in the optical fiber is reduced to a predetermined level to form a textured surface.

The textured surface preferably includes at least one of dimples, dots, and scratches. The dots are preferably made of material with an index of refraction that matches or substantially matches an index of refraction of the optical block.

The method further preferably includes molding the optical block. The textured surface preferably includes defects formed during the molding of the optical block.

The textured surface is preferably formed from laser processing. Preferably, the laser is a pulsed laser and has an emission wavelength that is absorbed in the optical block. The laser processing preferably includes scanning the laser across the reflective surface.

The above and other features, elements, characteristics, steps, and advantages of the present invention will become

BRIEF DESCRIPTION OF THE DRAWINGS

FIG. 3 is a cross-sectional view of a portion of an optical engine according to a preferred embodiment of the present invention.

FIG. 4 is top view of a molded optical structure.

FIG. 5 shows a portion of a molded optical structure with a textured area on a reflector surface according to a preferred embodiment of the present invention.

DETAILED DESCRIPTION OF PREFERRED EMBODIMENTS

The preferred embodiments of the present invention can be used in any application where the amount of optical power coupled into an optical fiber needs to be attenuated by an adjustable amount, including, for example, in an optical engine at an end of an active optical cable.

An optical engine is a device that performs optical-to-electrical conversion or electrical-to-optical conversion. For a receiver, the optical engine provides optical-to-electrical conversion; for a transmitter, the optical engine provides electrical-to-optical conversion; and for a transceiver, the optical engine provides both optical-to-electrical conversion and electrical-to-optical conversion. In a transceiver, the receiver and transmitter component are preferably separated to reduce cross-talk.

The optical engine typically includes electro-optical (EO) components connected to a substrate. The optical engine can also include a molded optical structure (MOS) or optical block that connects to the substrate and to optical fibers of an optical cable. Instead of optical fibers, any suitable optical waveguide can be used. The MOS provides an interface with the substrate at a position adjacent to the EO components. Optical paths through the MOS between the EO components and the optical fibers can include a lens system and a reflecting surface. The reflecting surface bends the light path, which can make aligning and mounting the optical fibers easier. The lens system controls the beam sizes, which can ensure good coupling efficiency between the various elements in the optical path. The optical engine can include a plurality of channels, each channel including an associated optical path. The optical engine can include a receive side and transmit side, and each side can include a plurality of channels.

The optical engine can be used in numerous computer connector systems including, for example: QSFP(+), CX4, CX12, SFP(+), XFP, CXP active optical cables; USB, CIO active optical cables; MDI, DVI, HDMI, Display Port, UDI active optical cables; PCIe x1, x4, x8, x16 active optical cables; SAS, SATA, MiniSATA active optical cables.

Figure 1:
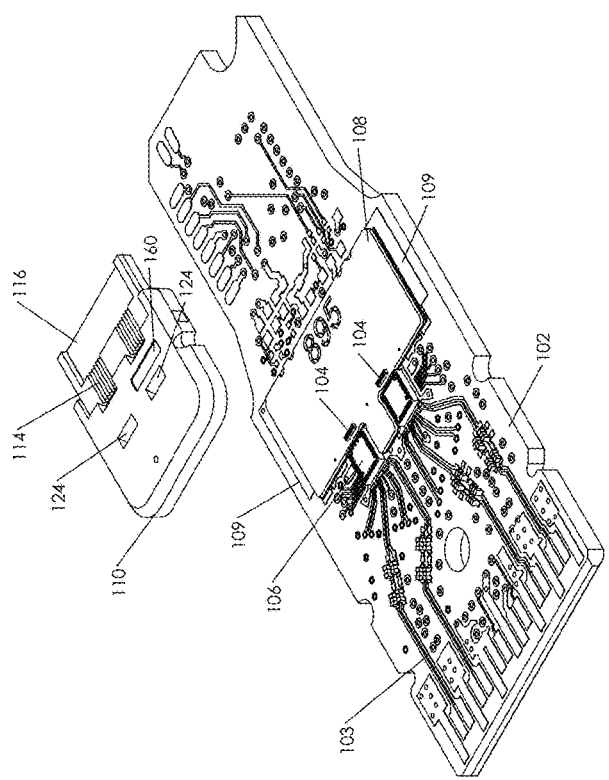
FIG. 1 is an exploded view of optical engine that can be used with the preferred embodiments of the present invention.
Figure 2:
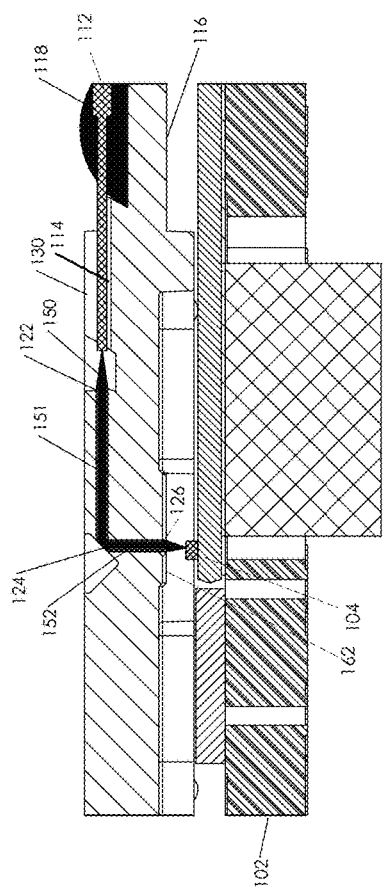
FIG. 2 is a cross-sectional view that shows an optical path of the optical engine shown in FIG. 1.

FIG. 1 is an exploded view of a portion of optical engine 100, and FIG. 2 shows an optical path 150 through the optical engine 100. FIGS. 1 and 2 in this application are similar to FIGS. 2 and 7 in U.S. Pat. No. 8,923,670, the entire contents of which are hereby incorporated herein by reference. The optical engine 100 includes a substrate 102, EO components 104 connected to the substrate 102, MOS 110 connected to the substrate 102, and optical fibers 112 connected to the MOS 110. The optical engine 100 is suitable for use with either single mode or multimode optical fibers.

A channel is defined by a single path along which signals are transported, i.e., transmitted and/or received. FIGS. 1 and 2 show a channel that includes an optical fiber 112, an optical path 150, an EO component 104, and a trace 103. A transmitting channel includes electrical signals that are inputted to the optical engine 100 at the edge of substrate 102, that propagate along the trace 103, that are converted to optical signals in the EO component 104, and that continue to the optical fiber 112. A receiving channel includes optical signals that are inputted to the optical engine 100 at the optical fibers 112, that are converted to electrical signals in the EO component 104, and that propagate along the trace 103 to the edge of the substrate 102.

The EO components 104 include, but are not limited to, laser diodes or laser diode arrays for a transmitting channel and photodetectors or photodetector arrays for receiving channels. The laser diode can produce either a single- or multi-transverse-mode output beam. The laser diode converts an electrical current into light. A laser diode can be, for example, a vertical-cavity surface-emitting laser (VCSEL), but other electrical-to-optical converters could also be used. The photodetector converts received light into a current. Any suitable photodetector can be used. The EO components can be electrically connected to traces 103 on the substrate 102 using either wire bonds or flip-chip techniques.

The MOS 110 is preferably connected to the substrate 102 at a position adjacent the EO components 104. The MOS 110 includes a lens system 120 that focuses and directs light from the optical fibers 112 onto the EO components 104 and/or focuses and directs light from the EO components 104 into the optical fibers 112. The MOS 110 can be made of a single injection-molded optical component or any other suitable device.

The MOS 110 includes grooves 114 that align and secure the optical fibers 112 in the MOS 110. It is possible to use structures other than grooves 114 to align the optical fibers 112. The grooves 114 can be V-shaped grooves or any other suitably shaped grooves. Each of the grooves 114 receives and aligns a corresponding optical fiber 112 in the MOS 110. A pressure plate 130 secures the optical fibers 112 in the grooves 114. The MOS 110 can include a strain-relief section 116 that extends beyond the grooves 114. Epoxy 118 can be used to secure the optical fibers 112 to the strain relief section 116. Grooves 114 allow assembly techniques in which the optical fibers 112 are held in a clamp and stripped, cleaved, passively aligned, and permanently attached to the MOS 110 in a single operation.

The MOS 110 can include one or more optical paths 150 through the MOS 100. Each optical path 150 preferably includes a first lens 126 positioned at a first end of the optical path 150 and a second lens 122 positioned at a second end of the optical path 150. The first and second lenses 122, 126 preferably collimate the light. The second lens 122 is adjacent to the optical fibers 112 and the first lens 126 is adjacent to the EO components 104 but is not so limited.

Each optical path 150 further includes a reflector 124 positioned between the first lens 126 and the second lens 122. The reflector 124 redirects light so the optical path is bent. The bend in the optical path can be approximately 90°, but this is not a requirement. The reflector 124 can use total internal reflection (TIR) to reflect all or substantially all of the incident light. The reflector can also use a reflective film applied to the MOS 110. Using a reflective film eliminates the angular constraints required of a TIR surface. Either or both of the first lens 126 or the second lens 122 can have no optical power, i.e. they are a flat surface.

Each optical path 150 includes a second section 151 and a first section 152. The second section 151 includes a second lens 122 at a second end of the second section 151 and a reflector 124 at a first end of the second section 151. The second lens 122 can be adjacent to the optical fibers 112, but is not so limited. The first section 152 includes the reflector 124 at a second end of the first section 152 and a first lens 126 at a first end of the first section 152.

The MOS 110 can include a component cavity 162 that creates an enclosed space between the planar surface of the substrate 102 and the MOS 110 for the EO components 104 mounted on substrate 102.

The substrate 102 can be any suitable substrate, including, for example, an organic substrate (e.g., FR4) or a ceramic substrate (e.g., Alumina). The substrate 102 can include electrical traces 103 that are used to route electrical data signals. The EO components 104 can include EO converters, and the semiconductor chips 106 can include, for example, analog chips, that drive the EO converters. The semiconductor chips 106 electrically drive the EO converters and can include, for example, a laser diode driver for the laser, and a trans-impedance amplifier (TIA) for the photodetector. The components of the optical engine 100 can be surface-mounted one the same side of the substrate 102 using standard semiconductor assembly processes.

A riser 108 can be connected to the substrate 102. The riser 108, which can be formed from metallic or ceramic compositions, for example, serves as a planar mechanical reference for receiving and aligning the EO components 104 and the MOS 110. The riser 108 is also used to conduct heat generated by the EO components 104 and/or the semiconductor chips 106 to one or more side or edge regions 109 of the optical engine 100.

The optical engine 100 can be manufactured using single-sided, surface-mount component assembly along with a two-step alignment process. The EO components can be bonded on the substrate 102 relative to fiducial marks by a precision die bonder. The EO components 104 for receiving channels and transmitting channels can be aligned and bonded precisely relatively to each other. The MOS 110 is aligned and bonded precisely relatively to the EO components 104. The MOS 110 includes grooves 114 for precise alignment of the optical fibers 112, and the optical fibers 112 are passively placed in the grooves 114 and attached to the MOS 110. In this manner, the optical fibers 112 are directly attached and aligned to the MOS 110.

For transmitting channels, the electrical signal coming from the electrical interface is preferably routed and wirebonded from the substrate 102 to a laser diode driver. The laser diode driver is preferably wirebonded to the laser diodes. For receiving channels, the electrical signal coming from the photodetector is preferably wirebonded to the TIA. The TIA is preferably wirebonded to the substrate 102 that route the electrical signals to the electrical interface. These components can be mounted using any suitable technique, including being flip-chip mounted.

Instead of or in addition to using an open cavity 160, the reflector 124 can be modified to attenuate the amount of light that enters the optical fiber 112. For example, the reflectivity of the reflector 124 can be reduced by defeating, spoiling, or degrading the surface of the reflector 124. Reduction of the surface reflectivity can be achieved by roughening, scratching, dimpling, or in some manner providing a fine pitched mechanical texture to the surface of the reflector 124. The textured surface on the reflector 124 is generally formed only on transmitting channels where attenuation of the optical power in the optical fiber is desired. The reflector 124 on receiving channels can remain untextured.

FIG. 3 shows a cross-section of a portion of optical engine 100. A laser 105 can be mounted on substrate 102. The laser 105 can be any suitable laser including a VCSEL. The laser 105 can include one or more individual laser emitters. The laser 105 can provide a modulated optical signal suitable for very high bandwidth signal transfer down an optical channel. The laser 105 generates a light beam that follows the optical path 150. A first lens 126 can be provided on a surface of the MOS 110. The first lens 126 can collimate or focus the light emitted by the laser 105. The reflector 124 preferably includes a textured surface so that some light is scattered or absorbed (scattered light is labeled as 111 in FIG. 3) while some light is specularly reflected (reflected light follows the optical path 150) towards the optical fiber 112 (not shown in FIG. 3). The light can be reflected because of total internal reflection or an optical coating applied to the surface of the reflector 124. A textured surface is defined as a surface with deliberately formed defects that degrade the optical quality of the surface. Roughening a surface or applying a pattern of light absorbing or scattering dots are non-limiting examples of forming a textured surface.

Optionally, a photodetector 107 can be mounted on the substrate 102 or some other location. In FIG. 3, alternative positions for the photodetector 107 are shown on the substrate 102 and above the reflector 124. But any suitable location can be chosen based on the spatial distribution of the scattered light 111 by the textured surface of the reflector 124. Some of the scattered light 111 can be directed toward the photodetector 107 such that the photodetector 107 samples a portion of the light emitted by the laser 105, which can be used for transmission (TX) monitoring so that the laser power level can be verified and/or adjusted during operation of the optical engine 100. The photodetectors 107 can be used in transmitting channels with a laser 105 as shown in FIG. 3 and can be used in receiving channels with a photodetector. In a receiving channel, the photodetector 107 could be a lower bandwidth, higher sensitivity photodetector that detects lower speed signals that the TIA does not output.

The MOS 110 can include features to isolate the individual channels from each other. For example, slits can be formed in the MOS 110 between the channels and filled with a light absorbing material. The amount of light reaching the photodetector 107 will be substantially proportional to the emitted laser power. It will also be substantially proportional to the optical power transmitted through the optical fiber 112 because the fraction of scattered light from the reflector is independent of the incident power level.

FIG. 4 shows a top view of the MOS 110. The MOS 110 includes a reflector 124 that directs light into an array of optical fibers 112. The MOS 110 shown in FIG. 4 preferably includes twelve grooves 114 that can be used with twelve optical fibers 112 (not shown in FIG. 4), and thus potentially twelve high-speed optical channels. FIG. 5 shows an example of a textured pattern on the surface of the reflector 124. The textured pattern can be uniform or substantially uniform, within manufacturing tolerances, over the intersection region 113 where the optical path 150 intersects with the surface of the reflector 124. The textured pattern can be an array of dimples 115 as shown in FIG. 5. The dimples 115 can be formed by laser marking or some other suitable method. The size of the dimples 115 in FIG. 5 has been exaggerated for clarity. Any number of dimples 115 can be used. There can be tens, hundreds, or thousands of dimples 115 on the surface of the reflector 124. The size and/or the number of dimples 115 can be adjusted to control the fraction of scattered light 111. Increasing the number of dimples 115 and making the dimples 115 larger tends to increase the amount of scattered light 111. The dimples 115 can be formed in a regular array, or the dimples 115 can be formed randomly to reduce possible patterns in the scattered light 111 from interference effects.

The textured surface of the reflector 124 can be made using a laser machining process, although other methods can be used. In the laser machining process, a laser is directed and optionally focused on the surface of the reflector 124. Application of the laser to the surface of the reflector 124 results in a spatially localized, mechanical, physical, or chemical alteration of the surface of the reflector 124. This alteration in the surface of the reflector 124 degrades the specular reflectivity of the surface of the reflector 124. Preferably, the textured surface covers or substantially covers, within manufacturing tolerances, the intersection region 113. Covering the entire intersection region 113 allows a uniform or substantially uniform reduction in the specularly reflected light, without impacting its spatial distribution. The coupling tolerances to the optical fiber 112 are thus not impacted by the texturing; only the magnitude of the specularly reflected light is impacted. It is also possible that the desired level of attenuation can be reached by selectivity degrading the reflector 124 over only a portion of the intersection region 113.

The surface of the reflector 124 can be modified by any number of methods. For example, lasers can be used to locally modify the reflective properties of the surface of the reflector 124. In particular, lasers operating at ultraviolet wavelengths can be used. Pulsed lasers based on Q-switching or fiber amplifiers converted to UV wavelengths in the vicinity of 355 nm using nonlinear optical processes are an example of a class of lasers that can work well for this application. Carbon dioxide lasers operating around 10 μm can also be useful. Both the UV and 10-μm-wavelength lasers are strongly absorbed by the optical quality plastic of the MOS 110. The pulse length of these lasers can be in the nanosecond or microsecond range, but this is not a requirement.

Alternatively, dots can be placed on the surface of the reflector 124. The dots can be absorptive, transparent, or translucent. The dots can be made from a material with an index of refraction that matches or substantially matches the index of refraction of the MOS 110 such that light is transmitted with little or no reflection through the surface of the reflector 124 into the dot. The light can then be absorbed in the dot, scattered in the dot, or reflected and refracted off the dot's rear surface. Each of these mechanisms can attenuate the light coupled into the optical fiber 112. The dots can be placed using ink-jet printing techniques, but this is not a requirement.

Mechanical scribing or scratching of the surface of the reflector 124 can also be used. For example, an array of sharpened pins can be pressed or dragged across the surface of the reflector 124. The array of sharpened pins can be made using MEMS (Micro-Electronic Mechanical Systems) processing techniques, but this is not a requirement.

The surface of the reflector 124 can be modified during the molding process of the MOS 110. That is, the MOS 110 can be molded such that the surface of the reflector 124 includes spatially localized defects. These defects can scatter light, reducing the amount of light that enters the optical fiber 112. Using MOS 110 with prefabricated defects can reduce the number of defects that need to be fabricated in an active manner, thus reducing processing time.

It is possible that any optical surface, i.e., a surface either that reflects light such as reflector 124 or through which light passes such as lenses 122, 126, can be modified to adjust the attenuation to a desired level. It is also possible that more than one optical surface can be modified. It is also possible to modify optical surfaces that include an optical coating. It is also possible to induce bulk scattering in the MOS 110 by creating spatially localized defects within the MOS 110. A focus laser with ultrashort pulses, i.e., picoseconds or femtosecond pulse lengths, can be used to locally change the refractive index of the MOS 110, but this is not a requirement.

The localized modified regions can be referred to as spots, independent of how the spots are formed (laser, ink-jet, array of sharpened pins, molding, etc.). Spot sizes should be a small percentage of the overall beam size. For example, if the optical path 150 provides a 200-μm beam size on the surface of the reflector 124, then spot sizes less than 25 μm are preferred. However, the spot size can be on the order of 1 μm, in some applications. Advantageously, a smaller spot size generally results in a more uniform attenuation of the light intensity. This makes the fraction of emitted light coupled into the optical fiber 112 independent of the spatial distribution of the emitted light. A further advantage of small spot sizes is that it provides better resolution to control the amount of light coupled into the optical fiber 112. Many spots can be made in a millisecond, and an array of spots can be made in less than one second.

Figure 6:
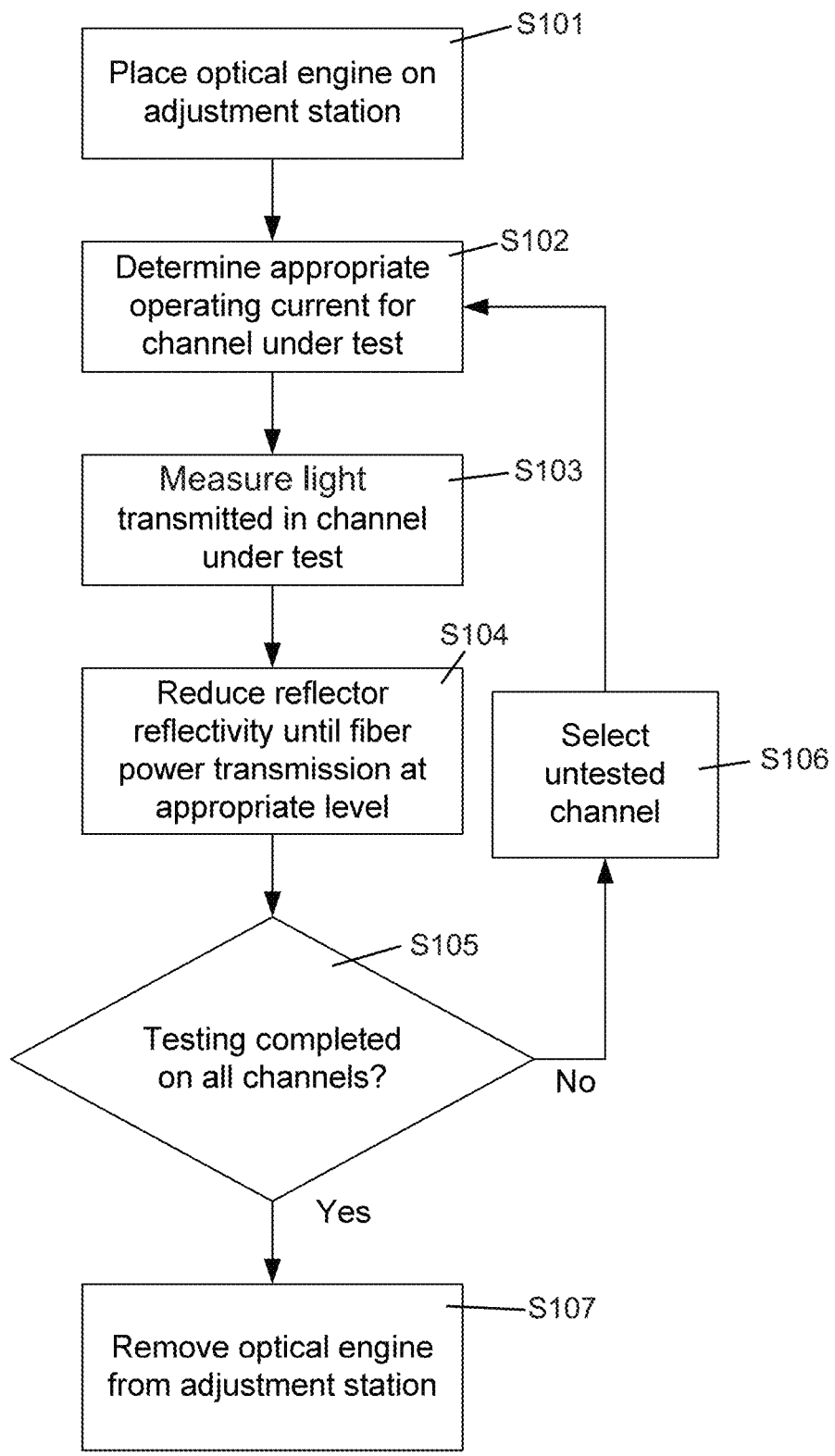
FIG. 6 is a flowchart diagram showing a method of achieving the proper attenuation level in all channels of an optical engine according to a preferred embodiment of the present invention.

The amount of scattered light can be adjusted using the method shown in FIG. 6. An optical engine 100 is first assembled. In step S101, the optical engine can be mounted on an adjustment station. The adjustment station provides the capability to both drive a laser under test and measure the light transmitted from the optical fiber associated with the laser under test. In step S102, a laser operating point can then be determined by finding a drive current that yields desirable modulation characteristics. As described above, this drive current can produce an excessively large optical signal level in the optical fiber. In step S103, the light in the optical fiber is measured. In step S104, the signal level in the optical fiber can be decreased by texturing the surface of the reflector. For example, the number of dimples, spots, defects, dots, or surface imperfections can be increased to increase the amount of scattered and/or absorbed light and reduce the amount of light coupled into the optical fiber. Alternatively, instead of, or in addition to, increasing the number of defects, the size or roughness of the defects can be increased to increase the attenuation level. For example, a focused laser spot can be raster scanned over the reflective surface 124, and the optical power level in the optical fibers 112 measured. If more attenuation is required, then the laser spot can be raster scanned over the same pattern, increasing the roughness of the reflective surface 124 and thereby increasing the attenuation level. The texturing can proceed until a desired fiber transmission level is achieved. In step S105, a determination is made as to if all of the channels have been tested and had their respective optical power levels in the optical fibers 112 adjusted. If all the channels have not been tested (the "No" decision in step S105), then in step S106 an untested channel is selected. If all the channels have been tested (the "Yes" decision in step S105), then in step S107, the optical engine is removed from the adjustment station.

It should be appreciated that the required attenuation can differ between optical channels. In the preferred embodiments of the present invention, the attenuation level can be readily adjusted by changing the degree of texturing for each channel. This is a significant advantage over the prior art technique of using a bulk attenuator having a substantially uniform attenuation for all channels. In the preferred embodiments of the present invention, the desired attenuation in each channel can be achieved without adding an extra part, e.g., the attenuator, to the optical engine 100. The preferred embodiments of the present invention also can eliminate the need to stock a wide variety of attenuators having different attenuation levels. Preferred embodiments of the present invention can adjust the attenuation level to more than 10 dB of the incident light. While any desired level of attenuation can be achieved, typically attenuation levels are between 2 dB and 5 dB. Using small spots can provide an attenuation resolution of 0.01 dB in each channel. But some applications may not require such fine resolution.

An optical surface with a textured surface can be combined with a bulk attenuator. The bulk attenuator provides a uniform attenuation level to all channels, and then each channel can be individually optimized by texturing. This combined system has the advantage of reducing the attenuation range required from the textured surface.

Figure 7:
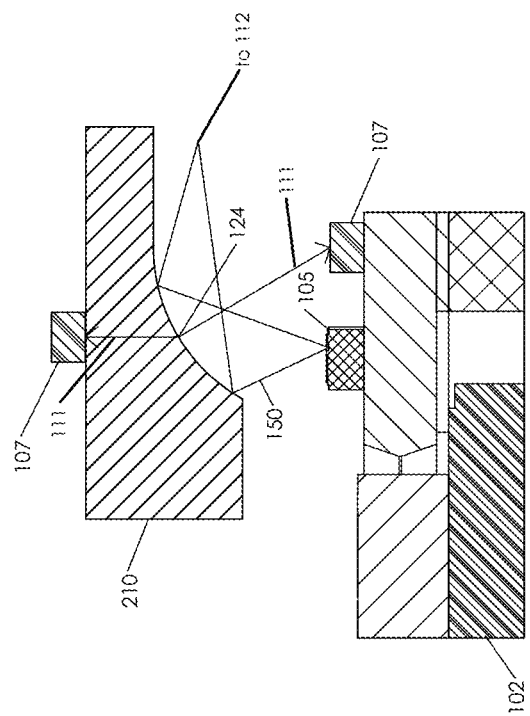
FIG. 7 is a cross-sectional view of a portion of an optical engine according to a preferred embodiment of the present invention.

While the preferred embodiments of the present invention have been described in terms of a textured surface of an optical surface in an optical engine, the concepts of the preferred embodiments of the present invention can be applied more broadly. For example, any optical data transmission system requiring attenuation can use the techniques described above to attenuate an optical signal by modifying an optical surface in the optical path of the system. For example, rather than a MOS 110 transmitting light through the structure, an alternative MOS 210 can be configured to reflect light from a first surface as shown in FIG. 7. The light path 150 never passes through the MOS 210. The reflective surface 124 could be curved to focus the light into the optical fiber 112. The reflective surface 124 could be textured by focusing light through the MOS 210 such that the focus is on or in the vicinity of the reflective surface 124. In this manner, the texturing light can modify the reflective properties of the reflective surface 124 even though the reflective surface 124 is not on an external surface of the optical engine 100. Any of the previously described texturing methods can also be used to provide the desired level of attenuation.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. An optical engine comprising:
   a substrate;
   a laser mounted to the substrate;
   an optical block including:
   multiple channels;
   a first surface that receives light entering the optical block that is generated by the laser;
   a second surface through which the light exits the optical block; and
   a reflector that reflects light from the first surface towards the second surface and that includes a textured surface including deliberately formed defects that scatter or absorb some of the light received from the first surface to attenuate the light exiting the optical block through the second surface; and
   an output optical fiber that receives light from the second surface of the optical block; wherein
   at least two channels of the multiple channels have different attenuation levels.

2. The optical engine of claim 1, wherein attenuation levels of the multiple channels of the optical engine are adjusted on a channel-by-channel basis.

3. A transceiver comprising the optical engine of claim 1; wherein
   the multiple channels include:
   at least two transmit channels; and
   at least one receive channel;
   the textured surface of the reflector attenuates light propagating in the at least two transmit channels; and
   no receive channel is attenuated by the textured surface.

4. A transmitter comprising the optical engine of claim 1; wherein
   the multiple channels include a plurality of transmit channels; and
   the textured surface of the reflector attenuates light propagating in at least two transmit channels of the plurality of transmit channels.

5. A method of light reductions, the method comprising:
   providing the optical block of claim 1;
   causing the laser to generate the light that the first surface receives, that the reflector reflects, and that exits through the second surface prior to the light entering the output optical fiber; wherein
   the textured surface reduces a light level in the output optical fiber.

6. The method of claim 5, wherein the multiple channels include a plurality of transmit channels.

7. The method of claim 6, further comprising individually optimizing the light level in each of the plurality of transmit channels.

* * * * *